US006920690B1

(12) United States Patent
Imoehl

(10) Patent No.: US 6,920,690 B1
(45) Date of Patent: Jul. 26, 2005

(54) METHOD OF MANUFACTURING A FUEL INJECTOR SEAT

(75) Inventor: William James Imoehl, Williamsburg, VA (US)

(73) Assignee: Siemens VDO Automotive Corp., Auburn Hills, MI (US)

( * ) Notice: Subject to any disclaimer, the term of this patent is extended or adjusted under 35 U.S.C. 154(b) by 0 days.

(21) Appl. No.: 09/559,749

(22) Filed: Apr. 27, 2000

Related U.S. Application Data

(60) Provisional application No. 60/131,251, filed on Apr. 27, 1999.

(51) Int. Cl.[7] .................................................. B23P 13/00
(52) U.S. Cl. ................................ 29/890.122; 29/888.44
(58) Field of Search ........................ 29/890.122, 888.44; 239/533.12, 585.1, 585.3, 585.4, 900

(56) References Cited

U.S. PATENT DOCUMENTS 2,273,830 A 2/1942 Brierly et al. ................ 29/157
2,534,531 A * 12/1950 Rossmanith (Continued)

FOREIGN PATENT DOCUMENTS

| | | | |
|---|---|---|---|
| DE | 2912814 | * | 10/1980 |
| DE | 3208536 | * | 9/1983 |
| DE | 42 22 137 A1 | | 1/1994 |
| DE | 199 07 859 A1 | | 8/1998 |
| FR | 2 772 432 A1 | | 12/1997 |
| GB | 2029508 A | | 8/1979 |
| GB | 2 073 954 A | | 4/1980 |
| GB | 2 140 626 A | | 4/1984 |
| GB | 2151516 | * | 7/1985 |
| JP | 0241973 | | 9/1990 |
| JP | 02-232378 | * | 8/1992 |
| JP | 10-128647 | * | 5/1998 |
| WO | WO 99/10648 | | 3/1999 |
| WO | WO 9910649 | | 3/1999 |
| WO | WO 99/31382 | | 6/1999 |

OTHER PUBLICATIONS

English Translation of 60–019957 (YUJI).*

Roberson, J. A. & Crowne, C.T. "Engineering Fluid Mechanics." 6th ed. 1997. p. 531–534.*

Patent Abstracts of Japan JP 60–019957 (Feb. 1, 1985); Japan Electronic Control Syst. Co. Ltd.

Patent Abstracts of Japan JP 59–180062 (Oct. 12, 1984); Isuzu Motors, Ltd.

*Geometrical Effects on Flow Characteristics of Gasoline High Pressure Direct Injecter*, W.M. Ren, J. Shen, J.F. Nally Jr., p. 1–7, (97FL–95).

*Primary Examiner*—Eric Compton

(57) ABSTRACT

A fuel injector seat for a fuel injector assembly, and more particularly for a high-pressure fuel injector assembly, having a number of features for minimizing the formation of combustion chamber deposits on the seat, providing a selected finish on a needle-sealing portion, and reducing sac volume. These features include positioning a transition portion between the needle-sealing portion and an orifice portion, positioning a sharp edge at the outlet of the orifice portion, and applying a coating to certain surfaces of the seat. This invention also relates to a fuel injector seat and method of manufacturing the fuel injector seat, and a method of evaluating when the transition portion is required between the orifice and needle-sealing portions for a particular seat arrangement.

8 Claims, 5 Drawing Sheets

U.S. PATENT DOCUMENTS

| | | | | | |
|---|---|---|---|---|---|
| 2,927,737 | A | | 3/1960 | Zeuch et al. | 239/533 |
| 3,430,388 | A | * | 3/1969 | Gabrielle | |
| 3,980,237 | A | * | 9/1976 | Parrish, Jr. | 239/533 |
| 4,120,456 | A | | 10/1978 | Kimura et al. | 239/464 |
| 4,545,152 | A | * | 10/1985 | Grimm | |
| 4,643,359 | A | | 2/1987 | Casey | 239/585 |
| 4,984,549 | A | * | 1/1991 | Mesenich | 239/585 |
| 5,114,077 | A | | 5/1992 | Cerny | 239/483 |
| 5,207,384 | A | | 5/1993 | Horsting | 239/463 |
| 5,241,938 | A | | 9/1993 | Takagi et al. | 123/472 |
| 5,271,563 | A | | 12/1993 | Cerny et al. | 239/533.2 |
| 5,409,169 | A | | 4/1995 | Saikalis et al. | 239/404 |
| 5,462,231 | A | | 10/1995 | Hall | 239/585.4 |
| 5,494,224 | A | | 2/1996 | Hall et al. | 239/585.5 |
| 5,601,476 | A | * | 2/1997 | Maier et al. | |
| 5,625,946 | A | | 5/1997 | Wildeson et al. | 29/888.41 |
| 5,630,400 | A | | 5/1997 | Sumida et al. | 123/470 |
| 5,636,796 | A | | 6/1997 | Oguma | 239/533.12 |
| 5,871,157 | A | | 2/1999 | Fukutomi et al. | 239/463 |
| 5,875,972 | A | | 3/1999 | Ren et al. | 239/463 |
| 6,173,494 | B1 | * | 1/2001 | Becker | 29/890.122 |
| 6,189,816 | B1 | * | 2/2001 | Stier | |

* cited by examiner

METHOD OF MANUFACTURING A FUEL INJECTOR SEAT

CROSS REFERENCE TO CO-PENDING APPLICATION

This application claims priority to U.S. Provisional Application No. 60/131,251, filed April 27, 1999, the disclosure of which is incorporated by reference herein in its entirety.

FIELD OF THE INVENTION

This invention relates to a fuel injector assembly, and more particularly to a high-pressure fuel injector assembly which includes a seat having a number of features for minimizing the formation of combustion chamber deposits on the seat. This invention also relates to the arrangement and manufacture of a fuel injector seat.

BACKGROUND OF THE INVENTION

Fuel injectors are conventionally used to provide a measured flow of fuel into an internal combustion engine. In the case of direct injection systems, a high-pressure injector extends into the combustion chamber. Consequently, a downstream face of the fuel injector's seat is prone to the formation of combustion chamber deposits. It is desirable to minimize this formation of deposits in order to maintain the intended operation of the fuel injector.

For the intended operation, it is critical for the seat to provide a sealing surface for engaging a displaceable closure member, e.g., a needle of a conventional fuel injector assembly. In a first position of the closure member relative to the seat, i.e., when the closure member contiguously engages the seat, fuel flow through the injector is prohibited. In a second position of the closure member relative to the seat, i.e., when the closure member is separated from the seat, fuel flow through the injector is permitted.

In order to provide the sealing surface, it is known to provide the seat with a conical portion having a desired included angle. Conventionally, grinding tools with a conical shape are used to grind the conical portion. It is also known that the quality of a surface finish is related to the grinding velocity. In the case of conical shape grinding tools, the grinding velocity decreases toward the apex of the tools.

In the case of fuel injector seats having a small orifice, the velocity of the grinding tool at the edge of the orifice is insufficient. Thus, conventional grinding operations cannot provide a selected finish on conventional conical portions.

SUMMARY OF THE INVENTION

The present invention overcomes the disadvantages of the seats in conventional fuel injectors, and provides a number of features for minimizing the formation of combustion chamber deposits.

According to the present invention, a transition portion is interposed between the conventional conical portion and the orifice, thus providing an additional volume in which the apex of the conventional grinding tool rotates.

However, excess sac volume, i.e., the volume of the fuel flow passage between the sealing band (i.e., the needle-to-seat seal) and the orifice, adversely affects the formation of combustion chamber deposits on the downstream seat. Thus, according to the present invention, the transition portion also minimizes sac volume.

Moreover, according to the present invention, a fuel injector seat is evaluated as to the necessity and configuration of a transition portion. This evaluation is based on different factors including orifice size and the included angle defined by the conical sealing portion.

Also, according to the present invention, an interface between the downstream face and the orifice is defined by a sharp edge. This facilitates dislodging combustion chamber deposits that may accumulate near the edge.

Additionally, according to the present invention, a fuel injector seat has a coating to control the formation of combustion chamber deposits in a first set of critical areas, and is uncoated in a second set of critical areas to facilitate the attachment and operation of the seat.

The present invention provides a method of forming a fuel injector seat. The seat has an upstream face, a downstream face, and a passage extending along an axis between the upstream face and the downstream face. The method of forming a fuel injector seat comprises forming within the passage an orifice portion proximate the downstream face and having a first transverse cross-sectional area relative to the axis; forming within the passage a sealing portion proximate the upstream face and having a second transverse cross-sectional area relative to the axis that decreases at a first rate in a downstream direction from a first area to a second area; determining a ratio of the first transverse cross-sectional area over the first area; and forming within the passage a transition portion when the ratio of the first transverse cross-sectional area over the first area exceeds a predetermined value, the transition portion being interposed between the orifice portion and the sealing portion and having a third transverse cross-sectional area relative to the axis that decreases at a second rate in the downstream direction from the second area to the first transverse cross-sectional area.

As it is used herein, the term "axis" is defined as a center line to which parts of a body to or an area may be referred. This term is not limited to straight lines, but may also include curved lines or compound lines formed by a combination of curved and straight segments.

As it is used herein, the term "rate" is defined as a value that describes the changes of a first quality relative to a second quality. For example, in the context of describing a volume, rate can refer to changes in the transverse cross-sectional area of the volume relative to changes in position along the axis of the volume. The term "rate" is not limited to constant values, but may also include values that vary.

As it is used herein, the phrase "included-angle" is defined as a measurement of the angular relationship between two segments of a body, when viewing a cross-section of the body in a plane including the axis of the body. Generally, the axis bifurcates the included angle.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT(S)

Figure 1:
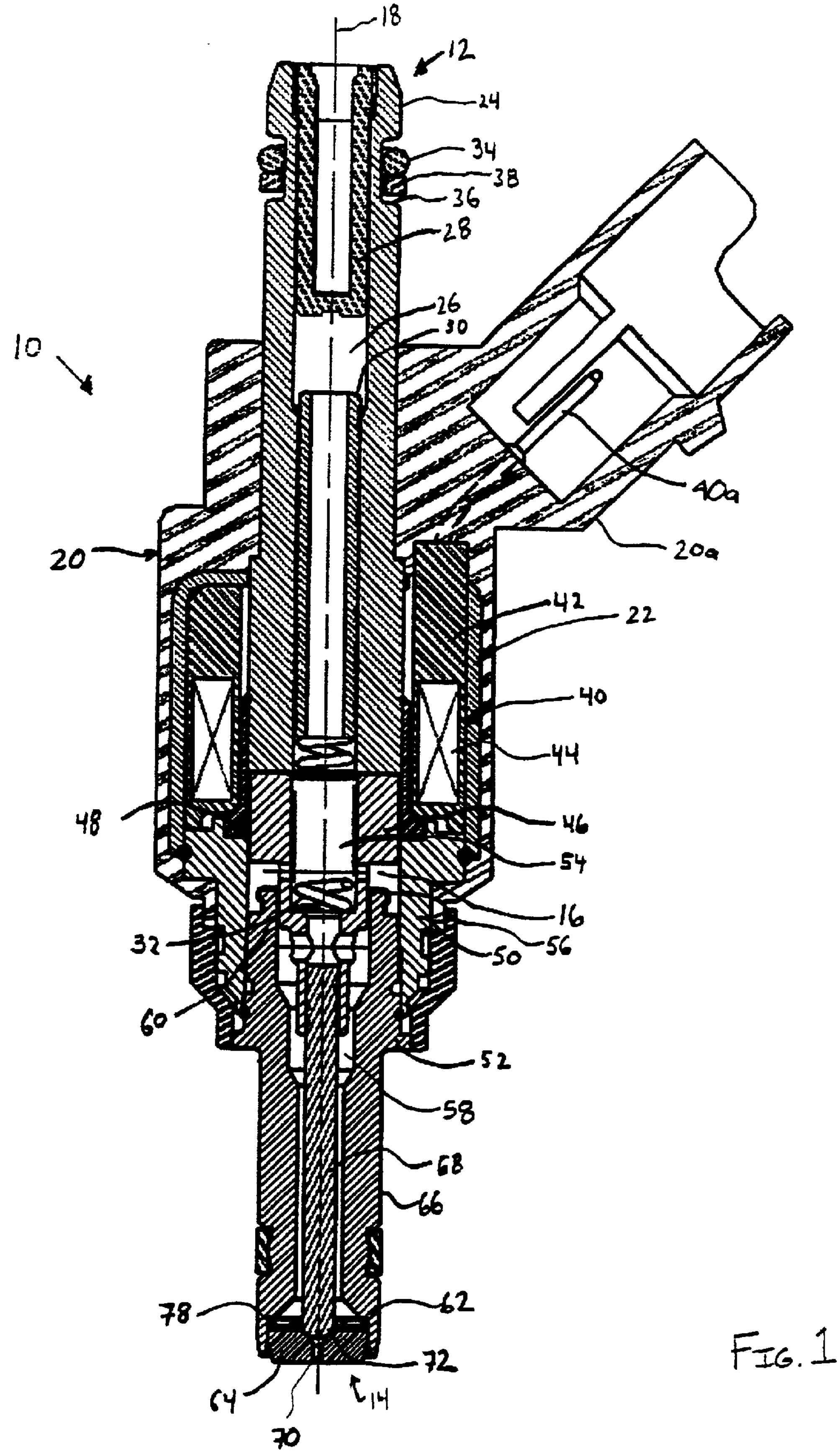
FIG. 1 is a cross-sectional view of a fuel injector assembly of the present invention taken along its longitudinal axis.

FIG. 1 illustrates a fuel injector assembly 10, such as a high-pressure, direct-injection fuel injector assembly 10. The fuel injector assembly 10 has a housing, which includes a fuel inlet 12, a fuel outlet 14, and a fuel passageway 16 extending from the fuel inlet 12 to the fuel outlet 14 along a longitudinal axis 18. The housing includes an overmolded plastic member 20 cincturing a metallic support member 22.

A fuel inlet member 24 with an inlet passage 26 is disposed within the overmolded plastic member 20. The inlet passage 26 serves as part of the fuel passageway 16 of the fuel injector assembly 10. A fuel filter 28 and an adjustable tube 30 are provided in the inlet passage 26. The adjustable tube 30 is positionable along the longitudinal axis 18 before being secured in place, thereby varying the length of an armature bias spring 32. In combination with other factors, the length of the spring 32, and hence the bias force against the armature, control the quantity of fuel flow through the injector. The overmolded plastic member 20 also supports a socket 20*a* that receives a plug (not shown) to operatively connect the fuel injector assembly 10 to an external source of electrical potential, such as an electronic control unit (not shown). An elastomeric O-ring 34 is provided in a groove on an exterior of the inlet member 24. The O-ring 34 is supported by a backing ring 38 to sealingly secure the inlet member 24 to a fuel supply member (not shown), such as a fuel rail.

The metallic support member 22 encloses a coil assembly 40. The coil assembly 40 includes a bobbin 42 that retains a coil 44. The ends of the coil assembly 40 are electrically connected to pins 40*a* mounted within the socket 20*a* of the overmolded plastic member 20. An armature 46 is supported for relative movement along the axis 18 with respect to the inlet member 24. The armature 46 is supported by a spacer 48, a body shell 50, and a body 52. The armature 46 has an armature passage 54 in fluid communication with the inlet passage 26.

The spacer 48 engages the body shell 50, which engages the body 52. An armature guide eyelet 56 is located on an inlet portion 60 of the body 52. An axially extending body passage 58 connects the inlet portion 60 of the body 52 with an outlet portion 62 of the body 52. The armature passage 54 of the armature 46 is in fluid communication with the body passage 58 of the body 52. A seat 64, which is preferably a metallic material, is mounted at the outlet portion 62 of the body 52.

The body 52 includes a neck portion 66 that extends between the inlet portion 60 and the outlet portion 62. The neck portion 66 can be an annulus that surrounds a needle 68. The needle 68 is operatively connected to the armature 46, and can be a substantially cylindrical needle 68. The cylindrical needle 68 is centrally located within and spaced from the neck portion so as to define a part of the body passage 58. The cylindrical needle 68 is axially aligned with the longitudinal axis 18 of the fuel injector assembly 10.

Operative performance of the fuel injector assembly 10 is achieved by magnetically coupling the armature 46 to the end of the inlet member 26 that is closest to the inlet portion 60 of the body 52. Thus, the lower portion of the inlet member 26 that is proximate to the armature 46 serves as part of the magnetic circuit formed with the armature 46 and coil assembly 40. The armature 46 is guided by the armature guide eyelet 56 and is responsive to an electromagnetic force generated by the coil assembly 40 for axially reciprocating the armature 46 along the longitudinal axis 18 of the fuel injector assembly 10. The electromagnetic force is generated by current flow from the electronic control unit (not shown) through the coil assembly 40. Movement of the armature 46 also moves the operatively attached needle 68 to positions that are either separated from or contiguously engaged with the seat 64. This opens or closes, respectively, the seat passage 70 of the seat 64, which permits or inhibits, respectively, fuel from flowing through the fuel outlet 14 of the fuel injector 10. The needle 68 includes a curved surface 78, which can have a partial spherical shape for contiguously engaging with a conical portion 72 of the seat passage 70. Of course, other contours for the tip of the needle 68 and the seat passage 70 may be used provided that, when they are engaged, fuel flow through the seat 64 is inhibited.

Figure 2:
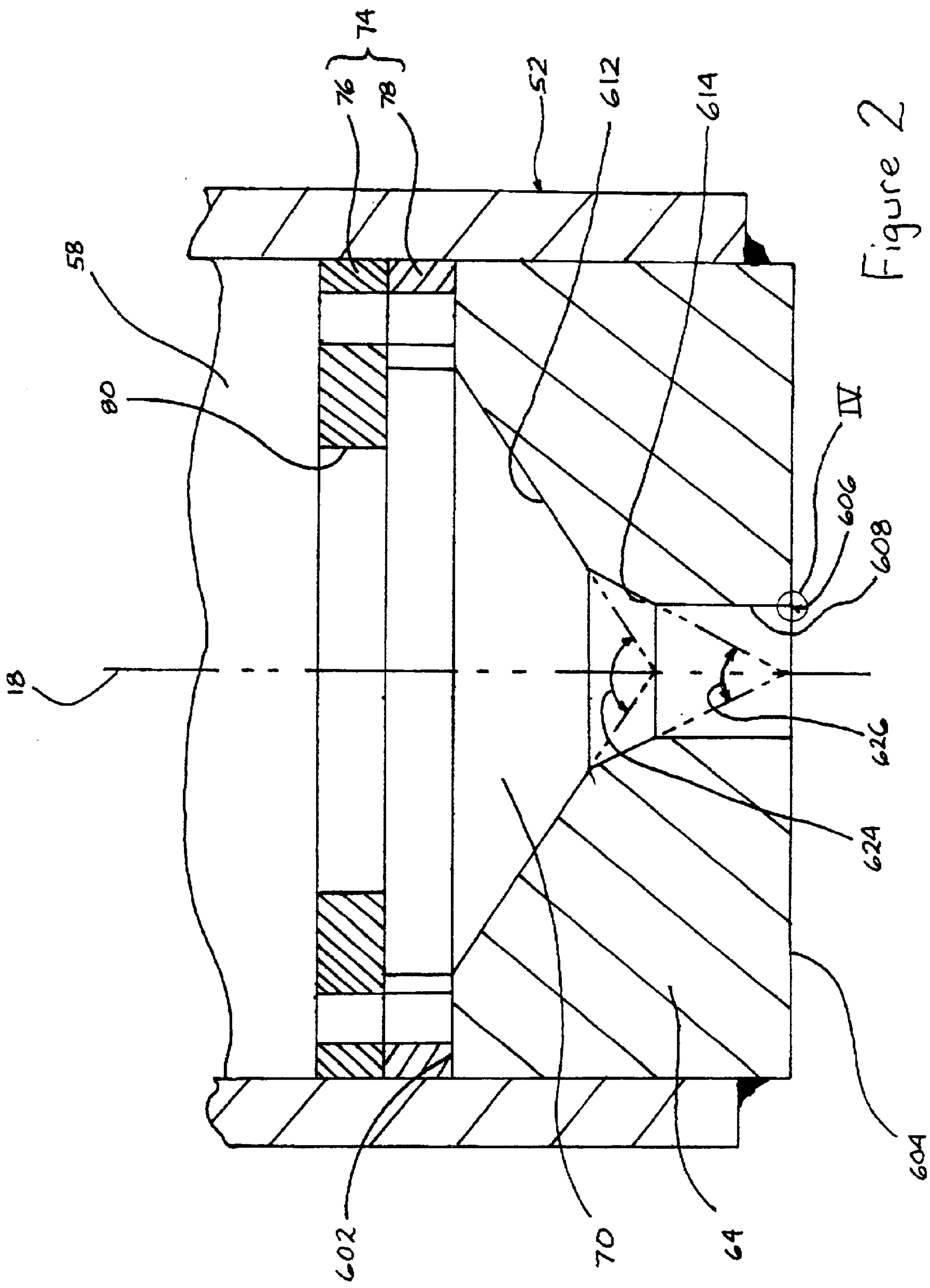
FIG. 2 is an enlarged portion of the cross-sectional view of the fuel injector assembly shown in FIG. 1 which illustrates a seat and a swirl generator according to the present invention.

Referring to FIGS. 1 and 2, an optional swirl generator 74 can be located proximate to the seat 64 in the body passage 58. The swirl generator 74 allows fuel to form a swirl pattern on the seat 64. For example, fuel can be swirled on the conical portion 72 of the seat passage 70 in order to produce a desired spray pattern. The swirl generator 74, preferably, is constructed from a pair of flat disks, a guide disk 76 and a swirl disk 78. The swirl generator 74 defines a contact area between the seat 64 and the body 52. The guide disk 76 provides a support for the needle 68.

The needle 68 is guided in a central aperture 80 of the guide disk 76. The guide disk 76 has a plurality of fuel passage openings that supply fuel from the body passage 58 to the swirl disk 78. The swirl disk 78 receives fuel from the fuel passage openings in the guide disk 76 and directs the flow of fuel tangentially toward the seat passage 70 of the seat 64. The guide disk 76 and swirl disk 78 that form the swirl generator 76 are secured to an upstream face 602 of the seat 64, preferably, by laser welding.

Fuel that is to be injected from the fuel injector 10 is communicated from the fuel inlet source (not shown), to the fuel inlet 12, through the fuel passageway 16, and exits from the fuel outlet 14. The fuel passageway 16 includes the inlet passage 26 of the inlet member 24, the armature passage 54 of the armature 46, the body passage 58 of the body 52, the guide disk 78 and the swirl disk 80 of the swirl generator 76, and the seat passage 70 of the seat 64. In a high-pressure, direct injection system, fuel is supplied from the inlet source in an operative range approximately between 700 psi and 2000 psi.

Referring to FIG. 2 in particular, the seat passage 70 of the seat 64 extends between the upstream face 602 of the seat 64 and a downstream face 604 of the seat 64. The seat passage 70 includes an orifice portion 608, a needle sealing portion 612, and a transition portion 614. The needle sealing portion 612 is disposed proximate to the first face 602, the orifice portion 608 is disposed proximate to the downstream face 604, and the transition portion 614 is interposed between the orifice portion 608 and the needle sealing portion 612.

The orifice portion 608 has a first transverse cross-sectional area relative to the longitudinal axis 18. That is to say, the first cross-sectional area can be measured in each of the imaginary planes that are oriented orthogonally to the longitudinal axis 18 as it extends through the orifice portion 608, or it can be measured in each of the imaginary planes within the orifice portion 608 that are parallel to the downstream face 604. It is most frequently the case that the downstream face 604 is oriented substantially orthogonal to the longitudinal axis 18, and the longitudinal axis 18 consists of a straight line extending throughout the entire fuel injector assembly 10. Consequently, the first cross-sectional area can be measured in each of the imaginary planes that are both oriented orthogonally to the longitudinal axis 18 and parallel to the downstream face 604.

Figure 3:
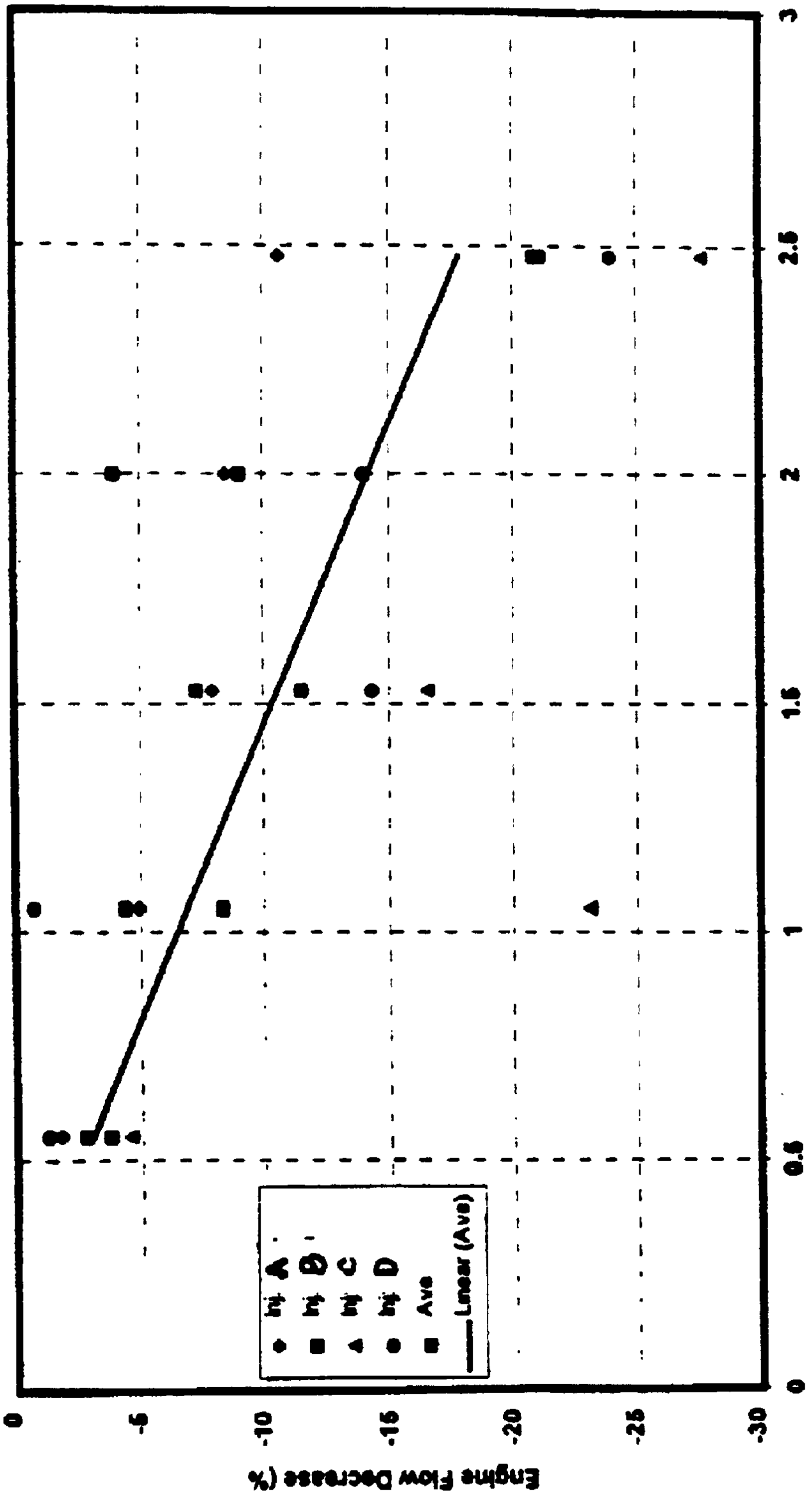
FIG. 3 is a graph illustrating engine flow decrease as a function of the ratio of orifice length over orifice diameter for different examples of fuel injectors.

The first transverse cross-sectional area can be substantially uniform throughout the orifice portion 608. For example, the first transverse cross-sectional area can be a circle having a diameter D and orifice portion 608 can extend along the longitudinal axis 18 a distance L. Thus, in the most frequent case described above, the orifice portion 608 comprises a right circular cylinder. Through experimentation, it has been determined that desirable operating characteristics for the fuel injector assembly 10 are achieved when the ratio of the length L to diameter D, i.e., LID, for the orifice portion 608 approaches, but is not less than, 0.3. FIG. 3 is an empirical data plot of flow changes due to deposit formation as a function of the L/D ratio.

The needle sealing portion 612 has a second transverse cross-sectional area relative to the longitudinal axis 18. That is to say, the second cross-sectional area can be measured in each of the imaginary planes that are oriented orthogonally to the longitudinal axis 18 as it extends through the needle sealing portion 612, or it can be measured in each of the imaginary planes within the needle sealing portion 612 that are parallel to the upstream face 602. It is most frequently the case that the upstream face 602 is oriented substantially orthogonal to the longitudinal axis 18, and the longitudinal axis 18 consists of a straight line extending throughout the entire fuel injector assembly 10. Consequently, the second cross-sectional area can be measured in each of the imaginary planes that are both oriented orthogonally to the longitudinal axis 18 and parallel to the upstream face 602.

The needle sealing portion 612 is formed by a tool 100, such as, for example, a grinding tool so as to provide a selected finish. The selected finish can be less than 0.5 micrometers, preferably between 0.2 micrometers and 0.4 micrometers. The contour of the needle sealing portion 612 can be described by the shape of each second transverse cross-sectional area and the rate that the second transverse cross-sectional area decreases throughout the needle sealing portion 612. The second transverse cross-sectional area can have a first area in the imaginary plane that is proximate to the upstream face 602, and decrease at a first rate to a second area in the imaginary plane that is distal from the upstream face 602. As discussed above, this rate may be constant or variable. In the case where the shape of each second transverse cross-sectional area is a circle having a diameter that decreases at a constant rate, as is illustrated in FIG. 2, the shape of the needle sealing portion 612 is that of a truncated right cone with an included angle 624. Of course, different shapes for the needle sealing portion 612 can be obtained by varying the shape of the second transverse cross-sectional areas or by varying the rate at which the second transverse cross-sectional areas change.

The transition portion 614 has a third transverse cross-sectional area relative to the longitudinal axis 18. That is to say, the third cross-sectional area can be measured in each of the imaginary planes that are oriented orthogonally to the longitudinal axis 18 as it extends through the transition portion 614, or it can be measured in each of the imaginary planes within the transition portion 614 that are parallel to the upstream face 602. It is most frequently the case that the upstream face 602 is oriented substantially orthogonal to the longitudinal axis 18, and the longitudinal axis 18 consists of a straight line extending throughout the entire fuel injector assembly 10. Consequently, the third cross-sectional area can be measured in each of the imaginary planes that are both oriented orthogonally to the longitudinal axis 18 and parallel to the upstream face 602.

The transition portion 614 can be formed by, for example, a grinding tool or a drill bit, etc. The contour of the transition portion 614 can be described by the shape of each third transverse cross-sectional area and the rate that the third transverse cross-sectional area decreases throughout the transition portion 614. The third transverse cross-sectional area can decrease at a second rate from the second area of the second transverse cross-sectional area to the first transverse cross-sectional area of the orifice portion 608. As discussed above, this rate may be constant or variable. In the case where the shape of each third transverse cross-sectional area is a circle having a diameter that decreases at a constant rate, as is illustrated in FIG. 2, the shape of the transition portion 614 is that of a truncated right cone with an included angle 626. Of course, different shapes for the transition portion 614 can be obtained by varying the shape of the second transverse cross-sectional areas or by varying the rate at which the second transverse cross-sectional areas change.

The transition portion 614 provides a volume which receives the tip of the grinding tool forming the needle sealing portion 612. Thus, only portions of the grinding tool that are driven at a sufficient grinding velocity contact the needle sealing portion 612, thereby producing at least a minimum selected finish over the entire surface of the needle sealing portion 612.

When the transition portion 614 is conically shaped, the included angle 624 of the needle sealing portion 612 is preferably greater than the included angle 626 of the transition portion 614. The included angle 624 can be approximately 15° greater than the included angle 626, e.g., the included angle 624 of the needle sealing portion 612 can be approximately 105° and the included angle 626 of the transition portion 614 can be approximately 90°. Of course, different combinations of included angles can be used provided that the needle sealing portion 612 sealingly conforms to the surface 78 of the needle 68, and the transition portion 614 facilitates providing a selected finish on the needle sealing portion 612. For example, it has been found that when the included angle 624 is approximately 104° and the included angle 626 is approximately 85°, flow stability is improved. If the included angle 626 is increased into the range of approximately 95° to 100°, flow stability decreases and deposit removal, perhaps as a result of cavitation, improves.

In addition to providing a transition between the needle sealing portion 612 and the orifice portion 608, the transition portion 614 minimizes the sac volume, i.e., the volume of the seat passage 70 from where the surface 78 of the needle 68 contiguously engages the needle sealing portion 612 to the orifice portion 608. For example, a transition portion 614 having the shape of a right circular cylinder would undesirably increase the sac volume as compared to a right cone, such as illustrated in FIG. 2.

Figure 4:
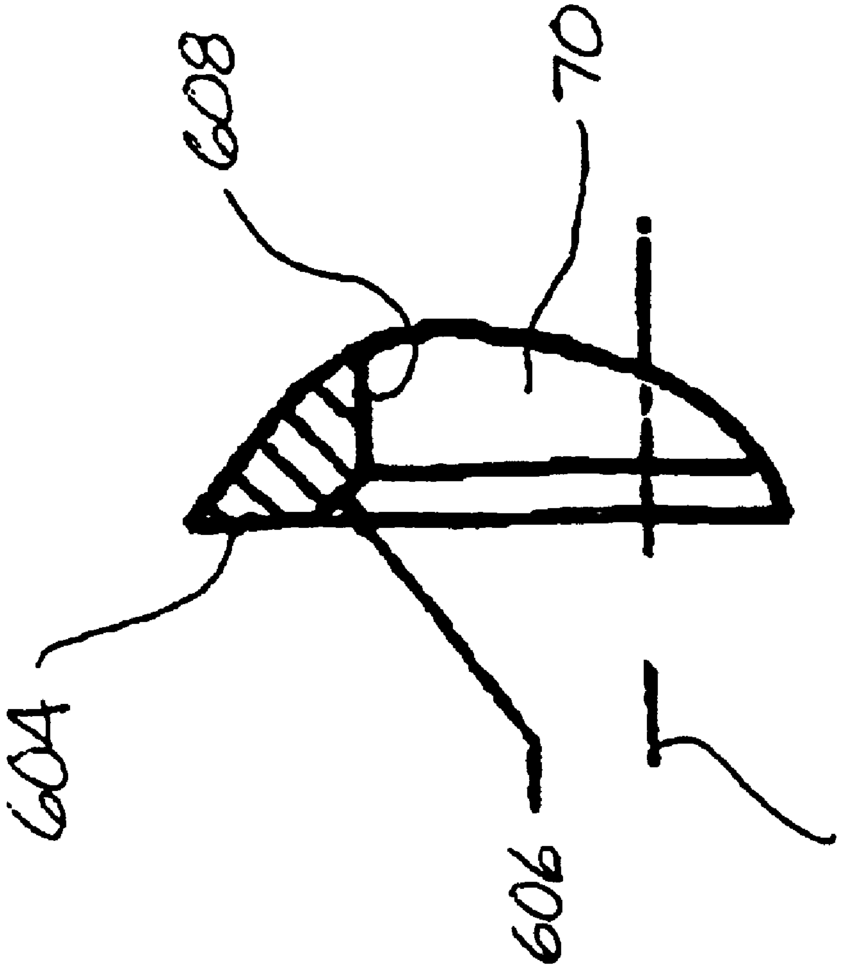
FIG. 4 is a detail view of a seat portion that is indicated by IV in FIG. 2.

Referring now to FIGS. 2 and 4, the interface at the junction of the downstream face 604 and the orifice portion

608 can be a sharp edge to facilitate the dislodging of combustion chamber deposits that form on the downstream face 604. In particular, a sharp edge prevents the formation of combustion chamber deposits on the downstream face 602 from continuing to accumulate on the orifice portion 608. That is to say, the pattern of deposit formation does not extend from the substantially flat surface of the downstream face 604 onto the substantially cylindrical surface of the orifice portion 608. Instead, a continued build-up of the deposits at the interface of the downstream face 604 and the orifice portion 608 results in a formation that can be readily dislodged by the high pressure spray of fuel passing through the orifice portion 608. According to the present invention, a sharp edge can be defined by an interface comprising an annular chamfered edge 606 connecting the perpendicular surfaces of the downstream face 604 and the orifice portion 608. The chamfered edge 606 can extend for approximately 0.02 millimeters and be oriented at 45° with respect to each of these perpendicular surfaces.

Figure 5:
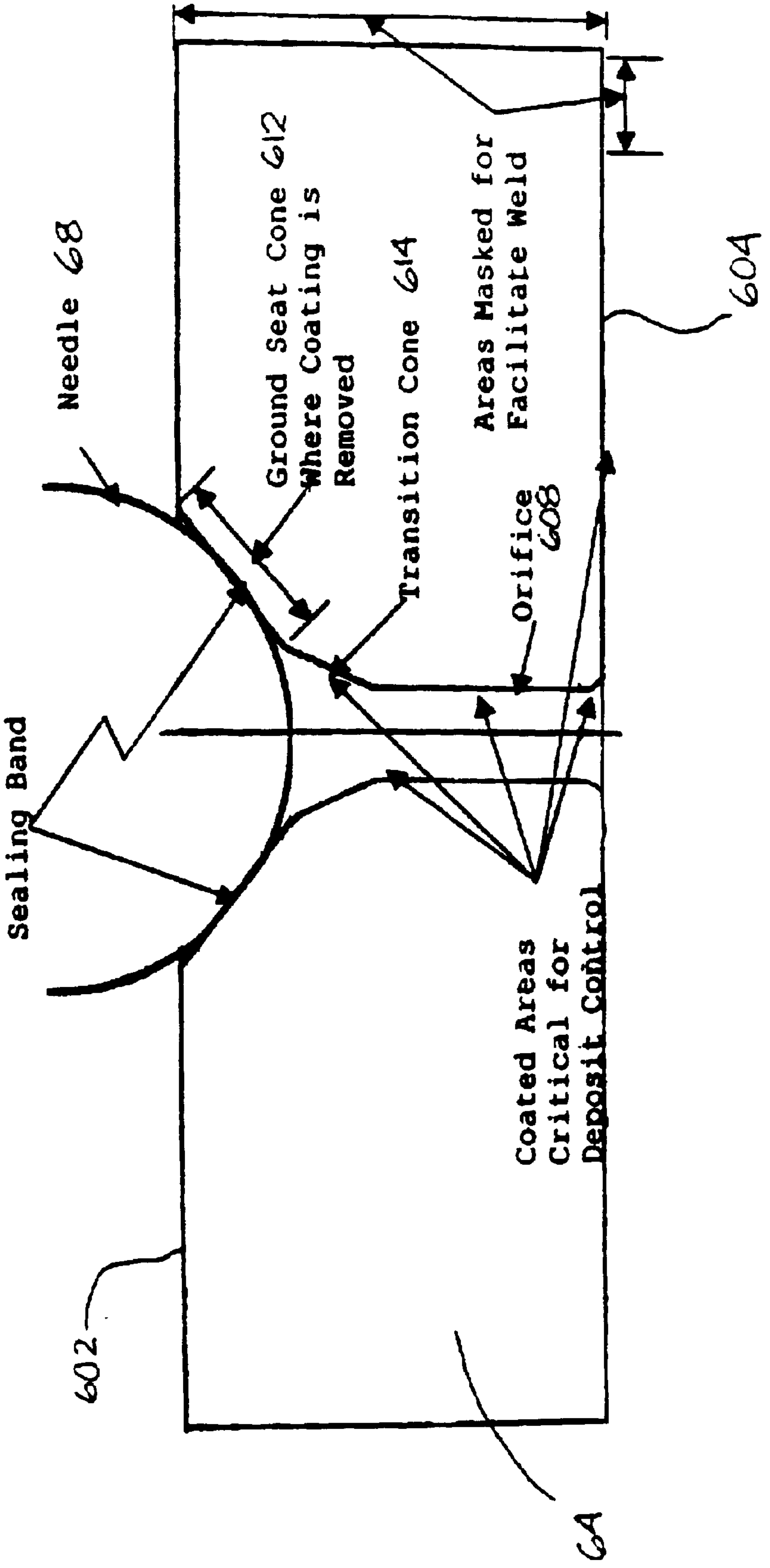
FIG. 5 is a schematic illustration of the seat according to the present invention indicating the critical areas of the seat that are coated and the critical areas of the seat that are uncoated.

Referring to FIG. 5, coatings that lower surface energy or reduce surface reactivity can also control the formation of combustion chamber deposits. Certain surfaces of the seat 64 can be coated, however, the presence of a coating can adversely affect certain critical surfaces of the seat 64. For example, coatings can reduce the effectiveness of the seat to needle seal, or can hinder the connection of the seat 64 with respect to the body 52. An injector seat blank, i.e., a seat 64 comprising the upstream face 602, the downstream face 604, and the rough passage 70 (prior to grinding the needle sealing portion 612), is coated or plated. Masking can be used to prevent applying the coating on an outer circumferential surface of the seat 64. Masking can also be used to prevent the application of the coating to a portion of the downstream face 604 that is proximate to the outer circumferential surface. These masked areas can subsequently be used for attaching the seat 64 with respect to the body 52. Grinding for the needle sealing portion 612 removes the applied coating in the area of the critical sealing band. Thus, the seat 64 is coated in the areas most necessary to inhibit deposit formation, and is uncoated in the critical sealing band area and in seat attachment area. The coating can be a carbon based coating, such as that sold under the trade name SICON, which can be applied by conventional vapor deposition techniques. The coating can also be fluoro-polymer based, aluminum based, or a ceramic. The contiguously engaging needle 68 can also be coated or can be uncoated.

The method of forming the fuel injector assembly 10 includes forming the seat 64 having the upstream face 602, the downstream face 604, and the seat passage 70 extending between the upstream face 602 and the downstream face 604. The method further comprises forming the orifice portion 608 and the transition portion 614 within the passage 70. Before applying a coating to the seat 64, the needle-sealing portion 612 can be rough formed and the sharp edge interface 606 can be formed between the downstream face 604 and the orifice portion 608. The orifice portion 608, the rough formed needle-sealing portion 612, and the transition portion 614 can be formed in any order, and by any technique, e.g., drilling, turning, etc. Moreover, any combination of the orifice portion 608, the rough formed needle-sealing portion 612, and the transition portion 614 can be formed concurrently by one operation, or all can be formed in a single operation. Next, the seat 64 can be masked and the coating applied to the seat 64. Thereafter, the seat 64 can be unmasked, and the selected finish on the needle sealing portion 612 can be formed by grinding. Alternatively, the needle sealing portion 612 can be formed with the selected finish in a single step, i.e., without separately rough forming the needle sealing portion 612. The transition portion 614 provides the volume for the grinding tool that is necessary to form the selected finish on the needle-sealing portion 612. And as discussed above, the transition portion also minimizes sac volume. The seat 64 is now ready to be mounted with respect to the body 52 of the fuel 25 injector assembly 10.

A number of factors are evaluated to determine the necessity of providing the transition portion 614 between the orifice portion 608 and the needle sealing portion 612. These factors include the first transverse cross-sectional area of the orifice portion 608, the included angle of the needle-sealing portion 612, and the selected finish to be provided on the needle-sealing portion 612.

The finish, or surface texture, of a material is a measurement of roughness, which is specified as a value that is the arithmetic average deviation of minute surface irregularities from a hypothetical perfect surface. Roughness is expressed in micrometers.

For a rotating grinding tool, linear velocity varies as a function of the radial distance from the axis of rotation. Therefore, if the finish produced by a rotating grinding tool at a radial distance corresponding to the edge of the first transverse cross-sectional area is too rough, a transition portion 614 according to the present invention is necessary.

The transition portion 614 provides a volume that is relatively near to the axis of rotation for a rotating grinding tool, and in which the grinding tool does not contact the seat 64. Thus, only those diameters of a rotating grinding tool that move with a sufficient grinding velocity are used to provide the selected finish on the needle-sealing portion 612.

According to the present invention, for a needle-sealing portion 612 having an included angle of approximately 105°, a transition portion 614 is necessary when the ratio of the first transverse cross-sectional area over the first area of the second transverse cross-sectional area is less than 0.5.

Of course, if the needle-sealing portion 612 is to be formed by a technique using something other than a rotating grinding tool, or the shape of the second transverse cross-sectional areas are not circular, the necessity of a transition portion 614 will be determined by evaluating the quality of the surface finish at the interface between the needle-sealing portion 612 and the orifice portion 608.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A method of forming a fuel injector seat, the seat having an upstream face, a downstream face, and a passage extending along an axis between the upstream face and the downstream face, the method comprising:

forming within the passage an orifice portion proximate the downstream face and having a first transverse cross-sectional area relative to the axis;

forming within the passage a sealing portion proximate the upstream face and having a second transverse cross-sectional area relative to the axis that decreases at a first rate in a downstream direction from a first area to a second area;

determining a ratio of first transverse cross-sectional area over the first area; and forming within the passage a transition portion when the ratio of the first transverse cross-sectional area over the first area exceeds a predetermined value, the transition portion being interposed between the orifice portion and the sealing portion and having a third transverse cross-sectional area relative to the axis that decreases at a second rate in the downstream direction from the second area to the first transverse cross-sectional area, wherein the forming of the sealing portion includes grinding with a tool that has a conical end with a vertex of the conical end disposed in the transition portion to provide a select finish on the sealing portion, the transition portion provides a volume receiving the vertex of the tool so that the vertex avoids contact with the sealing surface and with the transition portion, the vertex being contiguous to the axis.

2. The method according to claim 1, wherein the sealing portion comprises a first conical section defining a first included angle, and the transition portion comprises a second conical section defining a second included angle, and wherein the first included angle is greater than the second included angle.

3. The method according to claim 2, wherein the first included angle is substantially equal to 105°, and the second included angle is substantially equal to 90°.

4. The method according to claim 3, wherein a ratio of the first transverse cross-sectional area over the first area is less than 0.5.

5. The method according to claim 1, wherein the grinding tool is driven in rotation about an axis of rotation.

6. The method according to claim 1, wherein the select finish is less than 0.5 micrometers.

7. The method according to claim 6, wherein the select finish is approximately 0.4 micrometers.

8. The method according to claim 6, wherein the select finish is approximately 0.2 micrometers.

* * * * *